I. E. PALMER, DEC'D.
T. & N. T. PALMER, ADMINISTRATORS.
COMBINED COMMERCIAL CATALOGUE AND PORTFOLIO AND ART OF COMPILING ISSUABLE CATALOGUES THEREFROM.
APPLICATION FILED MAR. 15, 1911.
1,127,370. Patented Feb. 2, 1915.
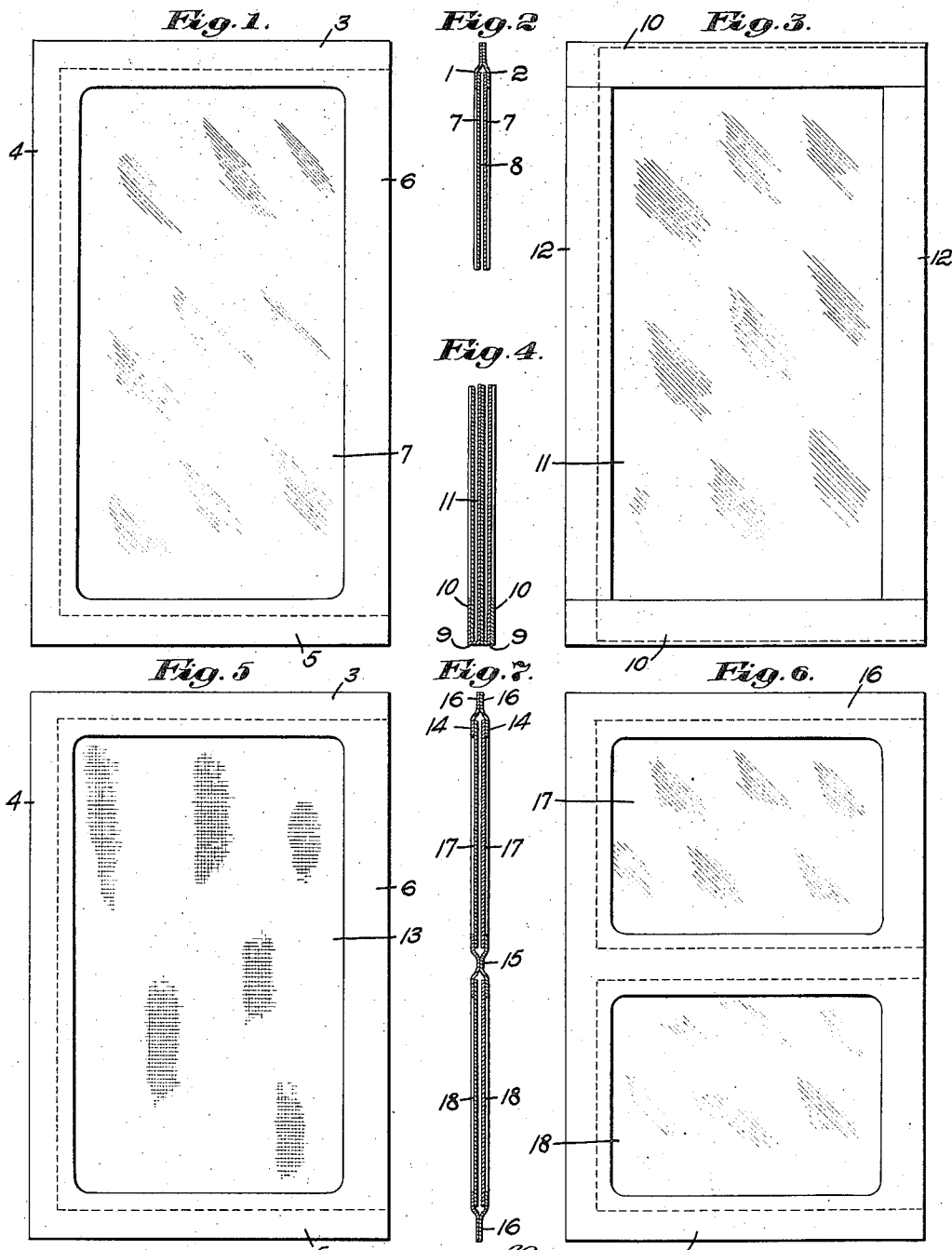
Witnesses:
Carl A. Choate
Horace A. Crossman
Inventor.
Isaac E. Palmer
Attys.

UNITED STATES PATENT OFFICE.

ISAAC E. PALMER, OF MIDDLETOWN, CONNECTICUT; TOWNSEND PALMER AND NATHALIE T. PALMER, OF MIDDLETOWN, CONNECTICUT, ADMINISTRATORS OF SAID ISAAC E. PALMER, DECEASED.

COMBINED COMMERCIAL CATALOGUE AND PORTFOLIO AND ART OF COMPILING ISSUABLE CATALOGUES THEREFROM.

1,127,370.     Specification of Letters Patent.     Patented Feb. 2, 1915.

Application filed March 15, 1911. Serial No. 614,516.

*To all whom it may concern:*

Be it known that I, ISAAC E. PALMER, a citizen of the United States, and a resident of Middletown, in the county of Middlesex and State of Connecticut, have invented an Improvement in Combined Commercial Catalogues and Portfolios and Art of Compiling Issuable Catalogues Therefrom, of which the following description, in connection with the accompanying drawings, is a specification, like characters on the drawings representing like parts.

This invention relates to combined commercial catalogues and portfolios.

In order that the principle of the invention may be readily understood, I have disclosed a single embodiment of said catalogue in the accompanying drawing, wherein—

Figure 1 is a plan view of one leaf of such catalogue embodying my invention; Fig. 2 is a vertical section of a portion thereof; Fig. 3 is a view similar to Fig. 1 of a modified form of my invention; Fig. 4 is a partial vertical section thereof; Figs. 5 and 6 are views similar to Fig. 1 of still further modified forms of my invention; Fig. 7 is a vertical section of that form of my invention shown in Fig. 6; and Fig. 8 is a vertical sectional view of one form of catalogue constructed in accordance with my invention.

Catalogues of manufacturing establishments are customarily gotten up yearly. Their preparation of necessity requires great care and much time. In order that new lines of goods may be illustrated or otherwise advertised the preparation of new material is required each year, but much advertised matter is of such a character that it is carried forward from year to year. Also from time to time certain lines of goods are revived after a lapse of a few years. This procedure requires the cutting up of catalogues of former years, the selection therefrom of such leaves as may be required for the new catalogue and the preparation of additional or new matter.

A catalogue gotten up in the manner indicated is necessarily prepared in a comparatively short space of time extending at the most over but a few weeks, and it is frequently found that had more time been available for the seelction of the materials to be advertised, a more effective collection might have been compiled.

In accordance with my invention I contemplate the preparation of a commercial catalogue wherein I may assemble from time to time throughout the year leaves from former catalogues, advertisements bearing upon new material, or samples of goods that are to be advertised. In this manner, I can rearrange the material from time to time by changing the order in which they are to be presented in the catalogue when issued in final form and make any desired additions thereto.

It is apparent that the commercial catalogue embodying my invention is capable of use with many different lines of manufacture. One important use thereof is in connection with textile industries and more especially those where cloth is woven and made up into various articles of manufacture. As a single instance of such line of manufacture, I may state that I have found the commercial catalogue embodying my invention to be peculiarly adapted for use in connection with textile establishments manufacturing woven hammocks. In such establishments heretofore so far as I am aware, yearly catalogues have been issued in book form, many of the leaves thereof displaying upon one face cuts of grades or types of hammocks and upon the opposite face descriptive matter pertaining thereto. As previously stated, these illustrations must yearly be changed to correspond to the new lines of goods that are being from time to time put upon the market.

By the use of a commercial catalogue which shall contain pockets or holders for segregated leaves of catalogues or segregated sheets containing new descriptive or illustrative matter, or even samples of material, I may assemble the material for a prospective catalogue at leisure and in such a manner that it may be readily inspected without disarranging it and yet may be shifted from time to time until in satisfactory and final form.

Preferably the pockets or holders of the catalogue are of such nature that one and sometimes both faces of each of the segregated sheets or leaves may be displayed for examination. Obviously this result may be accomplished in many different ways. Preferably, however, the catalogue is made up of a large number of leaves which are themselves loosely or detachably assembled. This may be accomplished by perforating at suitable points the inner edges of these catalogue leaves and then passing pins, split rings or other holding devices therethrough in such manner that the leaves are temporarily held together but may be rearranged. If desired, however, the leaves of the catalogue may be themselves bound together in permanent form and the material inserted in the pockets or holders from time to time may be shifted as desired. That is to say, instead of shifting the catalogue leaves themselves, their contents may be shifted. Each leaf of the catalogue, whether bound in permanent form or loosely assembled, is suitably made up so as to receive a sheet or sample. This may be effected by making each catalogue leaf of two sheets, one or both of which are transparent in part or in whole, so that one or both faces of the advertising matter may be displayed when positioned therebetween. The two sheets making up a single catalogue leaf are suitably separated along one edge for the insertion of the advertising matter, or if desired the catalogue leaf may be made up of a single sheet having opposed edges folded back upon the edge of the leaf, so that advertising material may be held between the body of the leaf and such folded back edges. It is obvious that my invention may be carried out in many different ways.

Referring more particularly to the drawings, Figs. 1 and 2 represent a single leaf of a commercial catalogue embodying my invention. In this form thereof, each leaf is made up of two skeleton sheets of material 1, 2 suitably secured together along the edges 3, 4, 5, and separated along the edge 6. Underlying or overlying the opening in each skeleton sheet 1, 2 is a transparent sheet of material 7—7 of celluloid or the like suitably secured to said sheets 1, 2 in such manner as to leave a space 8 therebetween for the insertion of the desired advertising material. It is evident that the said sheets 1, 2 may be separated along any desired edge. Instead of making sheets of skeleton form and inserting a panel of transparent material, it is evident that the entire sheets 1, 2 may be made of transparent material. It is evident that in employing that form of my invention shown in Fig. 1, I may inspect both faces of an advertising leaf inserted thereinto.

In that form of my invention shown in Figs. 3 and 4, each leaf of the catalogue is made up of a sheet 9, the upper and lower edges 10 whereof are folded back onto the face of the sheet. In this manner I provide at top and bottom of the catalogue leaf a guiding way between which the advertising material may be slipped. To the said folded back edges 10 I preferably attach a transparent panel 11 of some suitable material, such as celluloid, through which one face of the advertising matter may be inspected. In this form of my invention, the opposite face of the advertising matter is not capable of inspection without removal from the catalogue leaf. In certain forms of my invention, the transparent panel 11 may be omitted and the advertising sheet be held merely by the turned back edges 10, which themselves may be held in folded positions by longitudinal strips 12, 12. The inner of these strips 12 is preferably formed by turning the inner edge of the sheet in such manner that the turned upper and lower edges may be secured thereto. The outer strip 12 is, however, preferably a separate strip of suitable material secured to the upper and lower turned edges.

Instead of employing celluloid or some other transparent material as a panel through which the advertising matter is to be inspected, I may provide a panel of gauze or open mesh textile fabric, such as indicated at 13 in Fig. 5. The meshes of such woven material may be so large that the advertising matter or specimen may be critically examined. It is evident that if a sample of the woven material be held in this manner in the catalogue leaf, it may be more carefully examined as to texture, etc., through the open meshes than through transparent material. It is obvious that this gauze or other panel may be applied to the catalogue leaf in the manner shown in Fig. 2, or in the manner shown in Fig. 4.

If desired, certain leaves of the catalogue may be provided with two panels as indicated in Fig. 2, one of which may be of transparent material such as celluloid or the like, and the other of which may be gauze or other open mesh fabric permitting critical examination of the texture of the displayed material. Any other suitable combination of displaying panels may be provided.

It is obvious that the displaying panels, or certain of them, may be sub-divided or be of less extent than the entire leaf of the catalogue. For example, as shown in Figs. 6 and 7, the pages 14—14 may be provided with transverse band 15, along which they may be united as well as at their upper and lower edges 16. In this manner upper and lower display panels 17, 18 may be applied in any suitable way. These panels of a single catalogue leaf may be all of some suitable transparent material, or all of a suitable gauze like material, or any combination thereof.

It is obvious that in the use of my invention, I may from time to time apply to each catalogue leaf material pertaining to the prospective commercial catalogue that is issued in book form. Having compiled and re-arranged the material as desired, I may then make up therefrom the catalogue that is to be issued to the trade, this being of the usual nature, as previously described. That is to say, I may use the compiled commercial catalogue as a sample from which the permanent and issuable catalogue is to be made up. According to other uses of my invention, however, the material may be retained in the form here indicated for examination in the manufacturing establishment from time to time.

In Fig. 8, I have represented a catalogue constructed in accordance with my invention, wherein the catalogue envelops are indicated at 19 positioned between covers 20, 20 and temporarily held together by suitable binding means 21 passing through the inner edges of the envelops and securing them in book form.

Having thus described one form of my invention and the manner of use thereof, I declare that what I claim is—

1. A revisable commercial catalogue consisting of a series of envelop units each having one or both faces provided with a contents-inspection area and open along at least one edge, together with loose leaf binding means engaging the inner edges of said envelops and securing them in book form, thereby permitting re-arrangement of and additions to said catalogue.

2. A revisable commercial catalogue consisting of a series of envelop units each having one or both faces provided with a contents-display opening, and open along at least one edge, the inner edge of each envelop being perforated for the reception of temporary binding means.

3. A revisable, commercial catalogue comprising a series of envelop units, each having one or both faces provided with a contents-inspection area having open mesh material permitting inspection of the envelop contents.

4. A revisable, commercial catalogue consisting of a series of envelop units, each having one or both faces provided with a contents-inspection area having open mesh material permitting inspection of the envelop contents, with loose leaf binding means engaging the edges of said envelops and securing them together in book form, thereby permitting rearrangement of and addition to said catalogue.

In testimony whereof, I have signed my name to this specification, in the presence of two subscribing witnesses.

ISAAC E. PALMER.

Witnesses:
FRED. E. FOWLER,
CHAS. M. SAUER.